United States Patent Office 3,652,489
Patented Mar. 28, 1972

3,652,489
POLYESTER MOULDING COMPOSITIONS
Alan Crowe, St. Fagan, Cardiff, and David P. Fry, Llanishen, Cardiff, Glamorgan, South Wales, assignors to BP Chemicals Limited, London, England
No Drawing. Filed June 9, 1970, Ser. No. 44,887
Claims priority, application Great Britain, June 19, 1969, 31,070/69
Int. Cl. C08g 51/04
U.S. Cl. 260—40 R                    10 Claims

ABSTRACT OF THE DISCLOSURE

Solid free flowing moulding compositions based on a liquid unsaturated polyester resin system which is adsorbed on a finely divided inorganic primary filler and then blended with a secondary filler or larger average particle size to produce the free flowing particulate product.

---

The present invention is concerned with improvements in and relating to polyester moulding compositions.

Thermosetting moulding powders are known and comprise a mixture of a finely divided resin binder, e.g. a phenolic resin, filler, pigments and catalysts. These powders are free flowing and are therefore suitable for use in injection and extrusion moulding operations.

An object of the present invention is to provide a thermosetting moulding powder based on a liquid unsaturated polyester resin system which is in a free flowing form and is suitable for use in moulding operations.

Accordingly the present invention is a solid, free flowing, thermosetting moulding composition comprising a liquid unsaturated polyester resin system absorbed on a finely divided inorganic primary filler, and a secondary filler having a larger average particle size than the primary filler in sufficient quantity to produce a free flowing product.

The present invention is further a process for the preparation of a free flowing polyester moulding composition which comprises mixing the liquid unsaturated polyester resin system with a finely divided inorganic primary absorbent filler to absorb the resin system and form a dough, and blending the dough with a sufficient quantity of a second filler having a larger average particle size than the primary filler to form a free flowing moulding powder.

Liquid unsaturated polyester resin systems are commonly used as a basis for the resin binder for moulding compositions and this type of system is suitable for use in the solid free flowing moulding compositions of the present invention. They normally contain a liquid monomer that is copolymerisable with the unsaturated polyester.

The proportions and type of unsaturated polyester and copolymerizable monomer must be such as to give a liquid system.

Typically the polyester component of these systems can be prepared by poly-condensation of a polycarboxylic acid (or anhydride) with a polyhydric alcohol, one of the components having non-aromatic unsaturation capable of undergoing addition polymerisation e.g. ethylenic unsaturation. The dicarboxylic acids and dihydric alcohols are mainly used especially the α-unsaturated α,β-dicarboxylic acids. The unsaturated acids may be partly replaced by a saturated polycarboxylic acid, e.g. phthalic or isophthalic acids. It is preferred to use a mixture of saturated and unsaturated dicarboxylic acids together with a glycol. Suitable unsaturated acids are for example, malic, fumaric, or their anhydrides. Suitable dihydric alcohols are for example, ethylene glycol, diethylene, glycol, propylene glycol, hexylene glycol and the condensation products of ethylene or propylene oxide with bisphenol A. Part of the dihydric alcohol may be replaced by polyhydric alcohols such as pentaerythritol or by monohydric alcohols such as cyclohexanol. Alternatively, the polyesters can be prepared by reacting olefin oxides such as ethylene or propylene oxide with the foregoing acids or anhydrides.

Unsaturated monomers capable of copolymerization with the unsaturated polyesters are known from the literature and include monomeric vinyl and substituted vinyl compounds such as vinyl esters, the esters of acrylic, methacrylic, maleic or fumaric acids, allyl and polyallyl compounds and vinyl aromatic compounds. Some examples are styrene, vinyl toluene, and diallyl phthalate. The monomers can comprise between 25 and 75 percent by weight of the polyester in the system. The preferred system contains styrene as the monomer and in this system typical proportions of monomer in relation to the total weight of the liquid unsautrated polyester resin system are in the range 30 to 50 percent by weight and preferably in the range 35 to 45 percent by weight.

Most suitably the proportion of liquid unsaturated polyester resin system in relation to the total weight of the composition is in the range 10 to 40 percent by weight and preferably in the range 10 to 20 percent by weight.

The liquid unsaturated resin systems preferably contain a polymerisation initiator which is usually a free radical forming compound. Suitable initiators are well known, examples are benzoyl peroxide and tert. butyl perbenzoate. The amounts in which such initiators can be used are known. Typical quantities are in the range 0.1 to 8 percent by weight in relation to the total weight of liquid unsaturated polyester resin system.

The primary absorbent fillers suitable for use in the compositions of the present invention are finely divided inorganic materials preferably having an average particle size less than $5\mu$. They characteristically have the ability to absorb the liquid components of the composition, and to release them so that they can flow throughout the composition when it is subjected to pressure. Some examples of such fillers are Calofil A4, a precipitated calcium carbonate coated with a rosin, Calofort S, a precipitated calcium carbonate coated with stearate, Snowcal 7 ML, a finely ground chalk, and Snowcal CWI a finely ground chalk coated with a metal stearate. The primary filler should be present in a sufficient quantity to form a mixture of doughy consistency when mixed with the liquid constituents of the composition, i.e., sufficient is present to absorb all the liquid components. A suitable quantity to perform this function is from 100 to 400 weight percent of the total weight of the liquid constituents present in the composition.

The secondary fillers suitable for use in the compositions of the present invention are finely divided inorganic materials preferably having an average particle size greater than $10\mu$. They should be fillers which are easily wetted by the liquid constituents of the compositions, in order than an even distribution of the polymerisable constituents throughout the filler is achieved during the moulding operation. Some examples of suitable secondary fillers are: Alumina MH 70 and small glass beads such as Ballotini 3000 and 2429. Sufficient secondary filler should be added so that the dough produced by the addition of the primary filler is converted to a free flowing material. Suitable quantities of secondary filler are in the range 40 to 70 and preferably 50 to 60 weight percent of the total composition.

The moulding compositions may contain a thermoplastic material or liquid saturated polyester in known monomer as shrinkage control agents. Suitable thermoplastic materials are polystyrene, polyvinyl chloride, and polyethylene, and a suitable saturated polyester is Hexaplas PPA. The thermoplastic materials are preferably present in proportions from 2–14% by weight of the total composition. The liquid saturated polyesters may be added in proportions from 2 to 20% by weight of the total composition. In order to prevent exudation of the liquid saturated polyester on moulding a thermoplastic material can be added. See British patent specification 1,098,132.

Other modifiers, such as glass fibres, synthetic fibres such as acrylic, rayon or nylon fibres, and cellulosic fibres such as sisal may be added to the composition.

The preferred method of preparing the compositions according to the present invention is to mix all the constituents of the unsaturated polyester resin system first, that is: the unsaturated polyester, the copolymerizable monomer or monomers, catalysts, shrinkage control agents, modifiers, etc., prior to the addition of the primary filler and the subsequent addition of the secondary filler and other ingredients of the composition.

The following example illustrates the unsaturated free flowing moulding compositions of the present invention.

EXAMPLE

The following ingredients were thoroughly mixed in a blade mixer until a homogeneous product was obtained.

| Ingredients: | Parts by wt. |
|---|---|
| Resin (an isophthallic polyester/styrene mixture containing 60% polyester) | 10.00 |
| Additional styrene | 0.50 |
| Hexaplas PPA (polypropylene adipate) | 2.00 |
| Polystyrene | 1.00 |
| Zinc stearate lubricant | 0.85 |
| Stearine | 0.10 |
| BHT Inhibitor (butylated hydroxy toluene) | 0.05 |
| Benzoyl peroxide (65% paste in dimethyl phthalate) | 0.50 |
| Timonox (antimony oxide) | 2.00 |

The primary filler, Calofil A4 (25.00 parts by weight) was added to the mix, and blended until a mixture of doughy consistency was obtained.

The secondary filler, a mixture of Alumina MH 70 (38.00 parts by weight) and Ballotini 3000 glass beads (20.00 parts by weight) were blended in and mixed until a free flowing or "crumb" moulding compound was obtained.

This solid, free flowing thermosetting moulding composition was then used successfully in the production of moulded articles in a conventional injection moulding machine. The composition flowed easily in the machine and good mouldings were obtained.

We claim:

1. A solid free flowing thermosetting moulding composition comprising the admixture of (a) as a first component a liquid unsaturated polyester resin system absorbed on from 100 to 400% by weight of a finely divided inorganic primary filler having an average particle size of less than 5 microns with (b) as a second component a secondary filler having an average particle size greater than 10 microns in sufficient quantity to produce a free flowing product.

2. A moulding composition as claimed in claim 1 wherein the liquid unsautrated polyester resin system comprises an unsaturated polyester, a copolymerisable monomer and a polymerisation initiator.

3. A moulding composition as claimed in claim 2 wherein the weight of copolymerisable monomer is between 30 and 50% of the weight of the unsaturated polyester.

4. A moulding composition as claimed in claim 2 wherein the copolymerisable monomer is styrene.

5. A moulding composition as claimed in claim 1 wherein the polymerisation initiator comprises 0.1 to 8% by weight in relation to the total weight of the liquid unsaturated polyester resin system of benzoyl peroxide or tertiary butyl perbenzoate.

6. A moulding composition as claimed in claim 1 wherein the proportion of liquid unsaturated polyester resin system is in the range 10 to 20% by weight in relation to the total weight of the composition.

7. A moulding composition as claimed in claim 1 wherein the secondary filler is a finely divided inorganic material which is capable of being easily wetted by the liquid constituents of the composition.

8. A moulding composition as claimed in claim 1 wherein the moulding composition further contains a thermoplastic material and/or a liquid saturated polyester as a shrinkage control agent.

9. A moulding composition as claimed in claim 1 which also contains a fibrous reinforcing filler.

10. A process for the preparation of a free flowing polyester moulding composition as claimed in claim 1 which comprises mixing the liquid unsaturated polyester resin system with a finely divided inorganic primary absorbent filler to absorb the resin system and form a dough, and blending the dough with a sufficient quantity of a second filler having a larger average particle size than the primary filler to form a free flowing moulding powder.

References Cited

UNITED STATES PATENTS

| 3,462,514 | 8/1969 | Kurkowski et al. | 260—40 R X |
| 3,489,707 | 1/1970 | Fry | 260—40 R X |
| 3,227,665 | 1/1966 | Fourcode et al. | 260—862 X |

MORRIS LIEBMAN, Primary Examiner

S. M. PERSON, Assistant Examiner

U.S. Cl. X.R.

260—862